United States Patent [19]

Burkwall, Jr. et al.

[11] 4,015,026
[45] Mar. 29, 1977

[54] PROCESS FOR PREPARING A MOIST PET FOOD ADDITIVE, THE ADDITIVE, AND THE RESULTANT PET FOOD

[75] Inventors: Morris P. Burkwall, Jr., Marengo; Carl D. Engstrom, Elmwood Park; Robert F. Snyder, Hoffman Estates, all of Ill.

[73] Assignee: The Quaker Oats Company, Chicago, Ill.

[22] Filed: Aug. 14, 1975

[21] Appl. No.: 604,654

[52] U.S. Cl. .............................. 426/582; 426/614; 426/641; 426/656; 426/661; 426/805
[51] Int. Cl.² .................... A23C 19/12; A23L 1/32; A23K 1/10
[58] Field of Search .......... 426/558, 560, 582, 614, 426/661, 578, 641, 646, 656, 805

[56] References Cited

UNITED STATES PATENTS

| | | | |
|---|---|---|---|
| 3,738,847 | 6/1973 | Bechtel | 426/646 X |
| 3,741,774 | 6/1973 | Burkwall, Jr. | 426/582 |
| 3,808,341 | 4/1974 | Rongey et al. | 426/614 X |
| 3,946,123 | 3/1976 | Hanna | 426/560 X |

*Primary Examiner*—A. Louis Monacell
*Assistant Examiner*—R. A. Yoncoskie
*Attorney, Agent, or Firm*—Mathew R. P. Perrone, Jr.

[57] ABSTRACT

A stabilized proteinaceous particle containing either egg or cottage cheese is formed by combining therewith a binder and an amylaceous component. The resultant particle is incorporated in a moist food and is stable under retort canning conditions used to sterilize a moist food.

18 Claims, No Drawings

PROCESS FOR PREPARING A MOIST PET FOOD ADDITIVE, THE ADDITIVE, AND THE RESULTANT PET FOOD

BACKGROUND OF THE INVENTION

This invention relates to a food additive and more particularly to a food additive comprising a particle which is added to a food to create an egg or cottage cheese-containing food.

It is desirable to add proteinaceous particles such as egg or cottage cheese pieces to a moist food. One advantage to adding egg or cottage cheese pieces to a moist pet food is the added nutrition provided thereby. A further advantage includes improved palatability. While the palatability and nutrition remain in the moist food whether or not the egg and cottage cheese piece are visible in the food, the absence or the invisibility of either the egg or cottage cheese piece renders the canned food less acceptable to the consumer, or pet owner. If the pet owner cannot actually see the desired piece in the moist pet food, he is less likely to accept the content of the pet food as containing the additional nutritional and palatability values of the egg and cottage cheese pieces. From the pet owner's standpoint, visible proof of the egg or cottage cheese piece is highly desirable as well as the actual presence thereof. In this fashion, the pet food becomes more aesthetically pleasing as well as nutritionally acceptable.

However, when the proteinaceous pieces such as egg or cottage cheese are added to a moist food and the resultant moist food is sterilized using normal retort conditions, problems result. The cottage cheese alone is not stable enough to withstand these conditions. In fact, the cottage cheese breaks down and loses its characteristic white curd-like appearance. Egg when heat treated and added to the product is stable. However, the amount of egg needed to be added to the moist pet food to obtain the desired visible appearance is prohibitive from an economic standpoint. By economic standpoint is meant the egg is neither readily enough available nor low enough in price to use in a product of this type. Thus, a method of extending the egg piece or diluting it to obtain the desired appearance is required. Also, cottage cheese is expensive and not readily available, and thus needs to be diluted and stabilized to give the desired visible appearance. The means of diluting the egg and the cottage cheese piece while stabilizing the egg or cottage cheese piece must also provide for a maintained palatability, nutrition, and visibility of the piece in the product.

By "moist food" is meant that the water content — either as free water or combined with the components — exceeds about 50% by weight of the total food composition. The water provides a growth medium for microorganisms in the moist food. Therefore, the moist food must be canned or otherwise packaged and then sterilized. It is these sterilization conditions, for example 276° F. for 40 minutes, that potentially can destroy the appearance of egg and cottage cheese components in the moist food.

A particularly suitable use for moist food includes the pet food area. More particularly, a suitable use for a moist food containing cottage cheese and/or egg is as a pet dog food or as a puppy food. The additives of cottage cheese and egg provide extra protein, thereby assisting the growth and maintenance of the animal or puppy. The high quality of the protein provided by the cottage cheese and egg also assists the physiological development of the subject animal or puppy. Egg, in particular contains an excellent balance of amino acids essential to growth and maintenance. This extra high quality protein is especially essential to puppies. Thus it may be seen that there are a number of advantages for including proteinaceous pieces such as egg and/or cottage cheese in a pet food.

Additionally, as set forth above, the egg or cottage cheese components in the pet food must be distinct, realistic looking, and readily visible in the finished product. Cottage cheese by itself fails to retain its identity when retorted during a canning process.

To incorporate egg into the pet food product, it is possible to use egg white, whole egg, egg yolk or mixtures thereof. Any of these egg components are effective, but not economical ingredients as set forth above. Therefore, it is desirable to extend or dilute egg material and stabilize the resulting mixture to provide visual as well as nutritional acceptability. It is further desired to avoid cooking of the components prior to incorporation in the moist food since this is more laborious and expensive. Fresh frozen whole egg or reconstituted dry whole egg is somewhat stable during retorting provided they are first precooked, but it is economically unfeasible to add the necessary amount for visual appearance. Furthermore, the egg thus treated is not capable of producing uniform pieces of desired size for use in a process. Previous attempts at diluting the egg with starch or other ingredients to form a retort stable egg piece have met with little success.

Additionally, the treatment of the egg or cottage cheese components to form a stable composition must also permit forming particles of the composition for incorporation in the moist pet food. Particle form is essential, because uniform dispersion of the egg or cottage cheese component within the moist food is dependent thereon and desirable. Such forming of particles is highly complicated unless the composition retains the desired processability so the composition may be easily shaped into particles.

It thus becomes desirable to produce color stable, retortable, egg and cottage cheese components which are perceivable in the finished product.

A further problem with the art of food processing is to maintain a nutritional food having a required caloric content. This problem is solved by maintaining nutrition at a high level while adjusting the caloric content. In this manner, weight loss attributed to a dietetic food can occur while the nutritional value of the food is maintained. It is, therefore, desirable to provide a nutritional food having the proper caloric content in order to assist the weight loss. Such caloric modification using a cottage cheese component is especially helpful in feeding obese pets, since cottage cheese is very low in fat content. However, this modification in caloric content causes other problems with flavor and acceptability as well as nutrition.

Even assuming a composition suitable for use as a stabilized egg or cottage cheese piece can be made, a problem remains in making and reducing that composition to a usable particle size. Such further processing is a major problem. The processing is desirably carried out simply using standard equipment. If the composition is not usable in such simple fashion, the operability of the whole system is questionable.

Thus, it is seen that additives which provide nutrition and can be modified to provide a desired caloric content are highly suitable.

SUMMARY OF THE INVENTION

Therefore, it is an object of this invention to provide a moist food having improved nutrition.

It is further an object of this invention to provide a food having improved nutrition regardless of caloric content.

A still further object of this invention is to provide a food containing diluted stable egg-like components.

Yet a further object of this invention is to provide a food containing diluted stable cottage cheese-like components.

Another object of this invention is to provide a food having an excellent balance of amino acids.

Still another object of this invention is to provide a process for forming particles of an egg-like component for addition to a moist food.

Also, an object of this invention is to provide an improved process for forming particles of cottage cheese-like component suitable for use in a moist food.

A further object of this invention is to provide a moist food containing egg-like particles.

A still further object of this invention is to provide egg-like and cottage cheese-like pieces which need not be precooked.

Yet another object of this invention is to provide a simplified process for making egg-like and cottage cheese-like pieces.

Still another object of this invention is to provide a retort-stable proteinaceous piece.

These and other objects of the invention are met by providing proteinaceous pieces such as a stable cottage cheese-like piece or an egg-like piece and incorporating the resultant piece or pieces into a moist food.

DESCRIPTION OF THE PREFERRED EMBODIMENTS

A moist food has incorporated therein a stable proteinaceous piece such as cottage cheese piece or pieces or an egg piece or pieces. The egg or cottage cheese piece is stable under retort canning conditions used in the sterilizing of canned moist foods.

The retort stable proteinaceous piece is usually in particle form and generally comprises about 1 to about 50% by weight of the egg or cottage cheese protein source. Added to the protein source is about 0 to about 70% binder and from 5 to about 70% amylaceous ingredient. The moisture content of the particle prior to being mixed with the moist food is generally about 15 to about 60%. Optional ingredients include protein extenders, vitamins, minerals, etc.

Generally speaking, the egg component is in any suitable form. The egg component may be a whole egg, an egg white, egg yolk or mixtures thereof. (Hereafter, reference to egg or egg component includes the materials listed herein.) The various forms of the egg component which can be used are unlimited. Generally, a dried, frozen, or fresh component is suitable for use. Also, mixtures of the various types of egg are suitable for use. Generally speaking, the stabilized egg piece contains from 1 to about 50% egg. More preferably, the stabilized egg piece contains about 5 to about 30% egg. Most preferably the stabilized egg piece contains about 10 to about 25% by weight egg. The preferred range of egg content for the egg piece maximizes the value of the egg and the use of the relative amounts of ingredients therein.

The amylaceous ingredient which is included with the egg piece serves primarily as an extender or diluent, but also serves a number of other functions. It acts as a filler, a moisture absorber, and a dough viscosity adjuster. The amylaceous ingredient is generally readily available and may contribute to the binding characteristics of the particles. An amylaceous ingredient may have one or a plurality of components. The amylaceous ingredient used as a component of the particle in this invention is any suitable amylaceous, edible ingredient known in the art. The amylaceous ingredient can be at least one component selected from the group consisting of a starch or flour. A typical example of a starch is corn starch. Other suitable starches include amylopectin starch and modified food starches such as cross-linked waxy maize starches. A typical example of a flour is corn flour. Other suitable flours include oat flour, barley flour, and milo. About 5 to about a 70% range of amylaceous ingredient is operable. More preferably, about 10 to about 60% by weight amylaceous ingredient is used in the egg piece. Most preferably about 15 to about 50% of the egg piece is amylaceous ingredient.

The egg-like piece requires a binder to hold together and stabilize the entire piece. Whole egg, or egg white, if used in sufficient quantity, binds and holds together the piece. Alternatively, at least one gluten compound, such as wheat gluten or wheat flour in combination with the egg can function as a binder. These binders are preferred because they provide the desired taste characteristics and nutrition most efficiently. It is recognized that the cited binders can serve a dual function since they may also provide extra protein and/or extra starch.

The binder in the egg-like piece comprises 0 to about 70% by weight of the piece. More preferably, the binder comprises 5 to 40% by weight. Most preferably the binder comprises 10 to 35% by weight of the piece.

The moisture content of the final egg piece ranges from about 15 to about 60%. More preferably, the moisture content is about 20 to about 50%. Most preferably the moisture content is 25 to 45%. The range of moisture content is critical because the egg component must have a dough-like texture and be formable into particles. By a moisture content is meant the total moisture content of the particle whether supplied from other components or additional water to achieve the dough-like characteristics. Moisture content is a physical characteristic of the piece, not necessarily a component thereof. For example if a fresh egg is used to form the egg-like piece, then less water has to be added to achieve the dough-like characteristics. On the other hand, if the dried egg is used, then more water has to be added to provide the dough-like piece. The determination of the amount of water is a routine procedure. The critical feature is that the moisture content is suitable for forming the critical shaped piece. When the moisture content is determined by routine procedures, then water may be added to make up the desired moisture content. If the other components provide an amount in excess of the necessary moisture content, appropriate drying steps are applied to reduce the moisture content to the desired level, and allow the piece to be formed.

The egg piece can also have a protein extender, within about 0 to about 20% by weight based on the weight of the egg. The protein source provides a suitable extender for the egg piece in addition to the amylaceous ingredients. The protein source also provides additional protein. Typical protein extenders include the oil seed proteins and the vegetable proteins. Included among the oil seed proteins are soybean, rapeseed, peanut, and cottonseed. These oil seed proteins can be present in the product in the form of a meal, a concentrate, an isolate, a flour or mixtures thereof. Other protein extenders which can be added to the pieces of this invention include wheat germ, corn germ, wheat germ meal, corn gluten feed, corn gluten meal, corn distillers dried grain, and dried corn distillers solubles. Other additional sources of protein such as cottage cheese, cheddar cheese, other cheese and mixtures thereof are suitable for use as extenders, palatability enhancers, or nutrition enhancement. Also, the above-referenced protein sources can be modified either by acid, base, or enzymatic hydrolysis thereof, or mixed in any reasonable combination.

Optional ingredients which can be added to the egg piece include about 0 to 2% by weight yellow coloring. The colorings are edible food colorings which are generally acceptable as safe for use in foods and include such coloring as yellow 5, yellow 6, annatto, tumeric, etc. Further additives from 0 to about 5% by weight can also be included in the egg piece. These additives include edible materials such as antioxidants, fats, emulsifiers, minerals, unsaturated fats, and flavorings. Determinations of suitable amounts vary with the desired amount of nutritional ingredients to be included in the egg piece. These determinations are well within the skill of a routineer and easily determined thereby.

Other optional materials which may be included in the cottage cheese or egg piece in the amount of 0–5% include natural or synthetic gums. These natural or synthetic gums adjust dough viscosity and provide moisture absorption properties. Such variation permits the adjusting of the dough viscosity for the purpose of forming the particles. Typical examples of a suitable gum include carboxymethylcellulose or guar gum. Other typical gums which may be used to modify the dough of this invention are listed in U.S. Pat. No. 2,999,018 issued to Huffman, et al.

The basic ingredients in the cottage cheese piece include cottage cheese, a binder, and an amylaceous component.

Preferably, the cottage cheese piece contains from about 1 to about 50% by weight cottage cheese. The cottage cheese is either small or large curd or other suitable type of cottage cheese. The cottage cheese can be creamed or dried or in any other suitable state of preparation so long as it is suitable for providing a cottage cheese part of the particle. More preferably, about 5 to about 45% by weight of the cottage cheese particle is cottage cheese. Most preferably, about 10 to about 40% cottage cheese achieves the desired nutritional result and allows the piece to be stabilized.

While a gluten compound is suitable for use in the cottage cheese piece, the preferred binder suitable for use in this cottage cheese piece is wheat gluten or a wheat gluten based ingredient, or mixtures thereof. The binder may also be egg white or whole egg or mixtures thereof taken alone or in combination with the gluten as defined above. The type of egg which may be used as the binder are the same type of egg that are described above for use in making the egg piece. The whole egg is not used if a dietetic piece of cottage cheese is desired since the fat content is high. Egg can be used alone or in combination with gluten in a cottage cheese piece. Preferably, the binder comprises about 5 to about 50% by weight of the cottage cheese piece. More preferably, the binder comprises about 7½% to about 40% by weight of the cottage cheese piece. Most preferably, the binder comprises about 10 to about 35% by weight of the cottage cheese piece in order to achieve the most effective stabilized cheese piece.

The amylaceous ingredients, the color, the moisture, the additives, and the protein extenders for a cottage cheese piece are substantially the same as the materials defined for the stabilized egg piece as set forth above.

With regard to coloring to be added to the egg or cottage cheese, any edible coloring agent is suitable so long as the proper cottage cheese like color is provided to the cottage cheese piece. A suitable coloring for the cottage cheese type piece is any food grade whitener. Typical food grade whiteners include but are not limited to, calcium sulfate, magnesium oxide, titanium dioxide, etc.

The components as set forth above are formed by any suitable mixing device into a dough. It is desired that the dough be homogenous. Preferably, a dough mixer of the Sigma blade type or equivalent is used. A minimum of two minutes mixing time is usually required to form a homogenous dough having a texture and consistency suitable for further processing. A suitable maximum time is about 10 minutes. The dough thus formed is suitable for shaping into particles having up to 1.5 centimeters edge or diameter.

The dough is formed into particles suitable for addition to a moist pet food by extruding, without the application of direct or indirect heat, said dough on a standard extruder or grinder through a forming die and cutting the resultant formed product into the desired piece size. The pieces are then exposed to a flow of air to dry the pieces and reduce the tackiness thereof to thereby facilitate uniform dispersion of the pieces as the pieces are added to the moist pet food. Suitable drying time is about ¼ to about 4 minutes. Most suitable drying temperatures are about 15° to 60° C. Other drying processes may also be used.

The pieces, when processed as set forth above, are suitable for addition to a moist pet food without requiring prior cooking or heat treatment. Alternative methods for forming the pieces from the dough, not employing heat application, can also be used. The extrusion process, however, is the simplest, most efficient, and least expensive process for the purposes of this invention.

Preferably, the particle is up to about 1.3 centimeters in diameter if substantially spherical, or on the edge if cubical to provide the most suitable dispersibility and visibility. Other particle shapes have volumes equivalent to the above shapes. More preferred is a particle of 0.4 to 0.8 centimeter with 0.6 to 0.7 being most preferred. It is suitable to include any weight ratio of the stabilized egg piece and/or stabilized cottage cheese piece in the moist food so long as the amount is a visible amount. Preferably up to about 30% of the pet food is at least one of the pieces, or more preferably 25% is operable. Most preferably about 3 to about 10% of each of the egg pieces and of the cottage cheese pieces or up to 20% of a single component or mixtures thereof is suitable for use.

Generally speaking a moist pet food in which the egg or cottage cheese pieces are used comprises meat, meat by-products, some cereal or vegetable products, and various flavoring aids. Also, if desired, coloring of a suitable edible type may be added. Certain nutritional materials such as salt, vitamin mix, and mineral mix may also be added. Standard flavoring aids can be included in a moist pet food. The term meat is understood to apply to the flesh of cattle, swine, sheep, goats, horses, whale and other mammals, poultry, and fish. The term meat by-products includes such constituents as are embraced by that term in the Definition of Feed Ingredients published by Association of American Feed Control Officials, Inc. Such items as components of moist pet foods are well known in the art. This formulation generally represents the components of a moist pet food into which the egg and/or cottage cheese pieces of this invention may be incorporated. Generally speaking, the meat and meat by-products, comprise about 10 to about 90% by weight of the moist pet food singly or in any reasonable combination. The other materials cited, amount to about 10 to about 30% of the balance of the pet food. These other materials generally include about 0 to 20% meat meal, 0 to 25% vegetable or cereal products, and 0 to 10% additives. Generally speaking the moisture content of the moist pet food is in excess of about 50% by weight of the pet food and more preferably in excess of about 70%. The moisture content is provided by the moisture inherently present in the components of the pet food. Additionally, water is added to provide the desired water content of the moist pet food. A typical moist pet food is disclosed in U.S. Pat. No. 3,738,847 to Bechtel incorporated herein by reference.

The egg and cottage cheese pieces are incorporated into the moist pet food by first mixing the moist pet food components, as set forth above, in any suitable mixing device, preferably a blender of the ribbon type or equivalent. The moist pet food components are then heated to about 160° to about 220° F., preferably to about 170° to about 200° F. The egg and cottage cheese pieces are then added to the heated moist pet food and blended therewith for a minimum of one minute to attain uniform dispersion of the pieces within the moist pet food. The resultant product is then canned and retorted in the usual manner.

The egg and cottage cheese pieces are incorporated into the moist product by the method set forth above to attain maximum visibility of the pieces in the moist product, to minimize attrition of the pieces to the moist product, to maintain clarity of color in the moist product, to maximize contrast between the pieces and the moist product, and to attain the most optimum product texture.

Having thus described the invention, the following examples are presented to more fully illustrate the invention without limiting the same. All parts and percentages recited in the examples and throughout the specificiation are by weight of the total composition unless otherwise specified.

EXAMPLE 1

The following is an example of an egg and cottage cheese flavored canned dog food containing visible pieces made with egg and cottage cheese.

Table I lists formulations A or B for the egg and cottage cheese pieces respectively. To simplify commercial operation, the formulations are identical except that Formula A is a yellow (egg) color and Formula B a white (cottage cheese) color. The ingredients of each formulation are blended and water is added to form the respective dough. Each dough is then formed into 0.6 to 0.7 centimeter pieces without use of heat by using either an extruder or meat grinder with appropriate size dies or plates.

Table I

| | A (Egg) | B (Cottage Cheese) |
|---|---|---|
| Fresh Cottage Cheese | 10.0% | 10.0% |
| Dried Whole Egg | 10.0% | 10.0% |
| Vital Wheat Gluten | 23.0% | 23.0% |
| Corn Starch | 33.0% | 33.0% |
| Yellow Coloring | 0.6% | — |
| Titanium Dioxide (a whitener) | — | 1.0% |
| Water | 23.4% | 23.0% |
| | 100.0% | 100.0% |

Approximately 10 parts each by weight of the egg and cottage cheese pieces are blended with 80 parts by weight of a meat flavored dog food containing: Water, 50 parts; ground bone, 10 parts; chicken parts, 5 parts; meat by-products, 15 parts; soy grits and cereal, 15 parts; vitamins, minerals and flavorings and colorings, 5 parts.

After canning and retorting the above composition in the usual manner, the product has the appearance of a meat slurry product interspersed with distinct yellow and white pieces reminiscent of scrambled egg and large curd cottage cheese. This example illustrates the use of egg and cottage cheese as a flavorant in the product.

EXAMPLE 2

It is desired to produce an increased calorie, increased protein canned puppy food that also contains a significant amount of egg and cottage cheese protein. The following example gives a product that contains the equivalent of ½ of a whole medium egg and ½ tablespoon of cottage cheese per pound of product when the egg and cottage cheese formulations given in Table II are blended 10 parts each with 80 parts of a meat by-product slurry containing: water, 20 parts; meat by-products, 60 parts; ground bone, 10 parts; vitamins, minerals, flavorings and coloring, 5 parts; soy grits, 5 parts. The resultant product is a high protein, high calorie, food suitable for providing high nutrition to puppies.

The resultant slurry is heated to approximately 180° to 200° F. and the egg and cottage cheese pieces formed as in Example 1, added, and blended. The mixture is then canned, sealed and retorted until commercially sterile. After storage the can is opened and found to contain an acceptable moist dog food having visible, discreet, yellow egg-like pieces and white cottage cheese-like pieces. The ratio of egg to cottage cheese to meat flavored dog food may be varied according to the desired effects.

Table II

| | A (Egg) | B (Cottage Cheese) |
|---|---|---|
| Fresh Cottage Cheese | 20.0 | 20.0 |
| Dried Whole Egg | 20.0 | 20.0 |
| Vital Wheat Gluten | 13.0 | 13.0 |
| Corn Starch | 33.0 | 33.0 |
| Yellow Coloring | 0.6 | |
| Titanium Dioxide | — | 1.0 |
| Water | 13.4 | 13.0 |
| | 100.0 | 100.0 |

EXAMPLE 3

A reduced calorie canned diet food for obese dogs containing a mixture of low fat meat by-products, reduced protein and visible cottage cheese pieces (no egg) is formulated by addition of approximately 20 parts cottage cheese pieces to 80 parts of a meat, soy, cereal, cellulose slurry as follows: water, 50 parts; low fat meat by-products, 20 parts; ground bone, 8 parts; lean beef, 2 parts; soy grits and cereal, 10 parts; cellulose fiber, 5 parts; vitamins, minerals, flavorings and color, 5 parts.

| Cottage Cheese Piece | |
|---|---|
| Fresh Cottage Cheese | 20.0 |
| Vital Wheat Gluten | 15.0 |
| Corn Starch | 45.0 |
| Titanium Dioxide | 1.0 |
| Water | 19.0 |

The cottage cheese piece is mixed, extruded, diced and then added to the meat slurry and the mixture is then canned, sealed, and retorted in the usual manner. After a suitable storage period of about 1 month, the product is opened to reveal a meat slurry interspersed with large, white curd cottage cheese-like pieces that successfully retain their identity after processing. Because of the low fat content of both the egg and cottage cheese pieces, the product also has 20% less usable calories than a normal canned maintenance type of dog food.

Formulation for other potential egg and for cottage cheese pieces are illustrated in Table II demonstrating the scope of this invention. In each case they can be blended with a meat by-product, cereal, soy slurry to give various types of modified dog or cat food.

EXAMPLE 4

The egg piece indicated in Table III is formed and added to a meat by-product, soy and cereal slurry using the procedure of Example 1. A suitable moist pet food having visible egg-like pieces is obtained.

EXAMPLE 5

The ingredients listed in Table III are assembled and formed into a cottage cheese-like piece using egg as a binder and no wheat gluten. The resultant piece is incorporated into a moist pet food by the process of Example 1. A suitable pet food is obtained. This pet food contains visible cottage cheese pieces.

EXAMPLE 6

A suitable cottage cheese-like piece is formulated using the ingredients listed in Table III. A cottage cheese piece is incorporated into a moist pet food to thereby form a suitable moist pet food.

EXAMPLE 7

A suitable egg-like piece including no cottage cheese and including some gluten was formed as set forth in Table III. This egg piece when incorporated into a moist pet food provided a suitable egg containing moist pet food.

EXAMPLE 8

Example 7 is repeated to obtain an egg piece using no gluten. The egg piece is suitable for incorporation into a moist pet food.

We claim:
1. In a moist pet food comprising:
   a. at least 50% moisture;
   b. 10 to 90% of at least one component selected from the group consisting of meat and meat by-products;
   c. 0 to 20% meat meal;
   d. 0 to 25% vegetable or cereal products; and
   e. a visible amount of simulated cottage cheese pieces—the percentages of (a) through (e) being based on the weight of the moist pet food, the improvement comprising:
   the simulated cottage cheese pieces being retort stable and having a composition consisting essentially of:
   A. about 1 to about 50% cottage cheese;
   B. about 7.5 to about 40% of at least one binder selected from the group consisting of a gluten compound, egg white, and whole egg;
   C. about 5 to about 70% amylaceous ingredients;

TABLE III

| | Example 4<br>Egg piece with cottage cheese and no wheat gluten | Example 5<br>Cottage cheese piece w/egg and no wheat gluten | Example 6<br>Cottage cheese piece w/no egg and wheat gluten | Example 7 Example 8<br>Egg piece without cottage cheese | |
|---|---|---|---|---|---|
| | | | | (+gluten) | (−gluten) |
| Fresh Cottage Cheese | 20.0% | 20.0% | 20.0% | — | — |
| Dried Whole Egg | 20.0% | 20.0% | — | 20.0% | 20.0% |
| Wheat Gluten | — | — | 15.0% | 12.0% | — |
| Corn Starch | 45.0% | 45.0% | 15.0% | 40.0% | 50.0% |
| Wheat Flour | — | — | 15.0% | — | — |
| Soy Protein Isolate | — | — | 15.0% | — | — |
| Yellow-Color | 0.6% | — | — | 0.6% | 0.6% |
| Titanium Dioxide | — | 1.0% | 1.0% | — | — |
| Water | 14.4% | 14.0% | 19.0% | 27.4% | 29.4% |

D. about 15 to about 60% moisture content;
   E. 0 to about 20% of at least one protein extender selected from the group consisting of an oil seed protein and a vegetable protein;
   F. 0 to about 2% white coloring; and
   G. 0 to 5% of a natural or synthetic gum — all percentages of (A) through (G) being based on the weight of the simulated cottage cheese pieces.

2. The moist pet food of claim 1 wherein the gluten compound in the cottage cheese pieces is a wheat gluten based ingredient.

3. The moist pet food of claim 2 wherein the simulated cottage cheese pieces comprise:
   a. 5 to 40% cottage cheese;
   b. 10 to 60% amylaceous ingredient; and c. 20 to 45% moisture content the percentages herein being based on the weight of the simulated cottage cheese pieces.

4. The moist pet food of claim 3 wherein the cottage cheese pieces comprise:
   a. 10 to 35% cottage cheese;
   b. 10 to 35% binder;
   c. 15 to 50% amylaceous ingredient; and
   d. 25 to 40% moisture content.

5. The moist pet food of claim 4, wherein an egg component is the binder of the cottage cheese pieces.

6. The moist pet food of claim 4 wherein the wheat gluten based ingredient in the cottage cheese pieces is vital wheat gluten.

7. The moist pet food of claim 1 further comprising simulated egg pieces wherein the simulated egg pieces are retort stable and have a composition of:
   A. about 1 to about 50% of an egg component;
   B. about 5 to about 70% of an amylaceous ingredient;
   C. 0 to about 70% of a binder selected from the group consisting of a gluten compound, wheat flour, and mixtures thereof;
   D. about 15 to 60% moisture content;
   E. 0 to about 50% of cottage cheese;
   F. 0 to about 20% of at least one protein extender selected from the group consisting of cheddar cheese, an oil seed protein, and a vegetable protein;
   G. 0 to about 2% of a yellow coloring agent; and
   H. 0 to 5% of natural or synthetic gum.

8. The moist pet food of claim 7 wherein the egg component of the egg pieces is at least one selected from the group consisting of a whole egg, egg white, and egg yoke.

9. The moist pet food of claim 8 wherein the whole egg of the egg pieces is dried, fresh, or frozen.

10. The moist pet food of claim 9 wherein the whole egg of the egg pieces is fresh.

11. The moist pet food of claim 8 wherein the simulated egg pieces comprise:
    a. 5 to 40% of the egg component;
    b. 10 to 60% of the amylaceous ingredient; and
    c. 20 to 45% of the moisture the percentages herein being based on the weight of the simulated egg pieces.

12. The moist pet food of claim 11 wherein the egg component comprises 10 to 25% by weight of the simulated egg pieces.

13. The moist pet food of claim 12 wherein the simulated egg pieces comprise up to about 15% by weight of the moist pet food and the simulated cottage cheese pieces comprise up to about 15% by weight of the moist pet food.

14. The moist pet food of claim 13 wherein the simulated egg pieces comprise about 3% to about 10% by weight of the moist pet food and the simulated cottage cheese pieces comprise about 3 to about 10% by weight of the moist pet food.

15. The moist pet food of claim 12 wherein the simulated cottage cheese pieces or a mixture of the simulated cottage cheese pieces and the simulated egg pieces comprise up to 30% by weight of the moist pet food.

16. The moist pet food of claim 15 wherein the simulated egg pieces and the simulated cottage cheese pieces each have a volume equal to the volume of a sphere wherein the sphere has a diameter of up to 1.3 centimeters.

17. The moist pet food of claim 16 wherein the sphere has a diameter of 0.6 to 0.7 centimeter.

18. The moist pet food of claim 12 wherein the protein extender for the cottage cheese pieces and the egg pieces is at least one selected from the group consisting of soybean, rapeseed, peanut, cottonseed, wheat germ, corn germ, wheat germ meal, corn gluten feed, corn gluten meal, and corn distillers dried grain.

* * * * *